(Model.)
A. T. CWERDINSKI.
FAN.
No. 523,762.  Patented July 31, 1894.
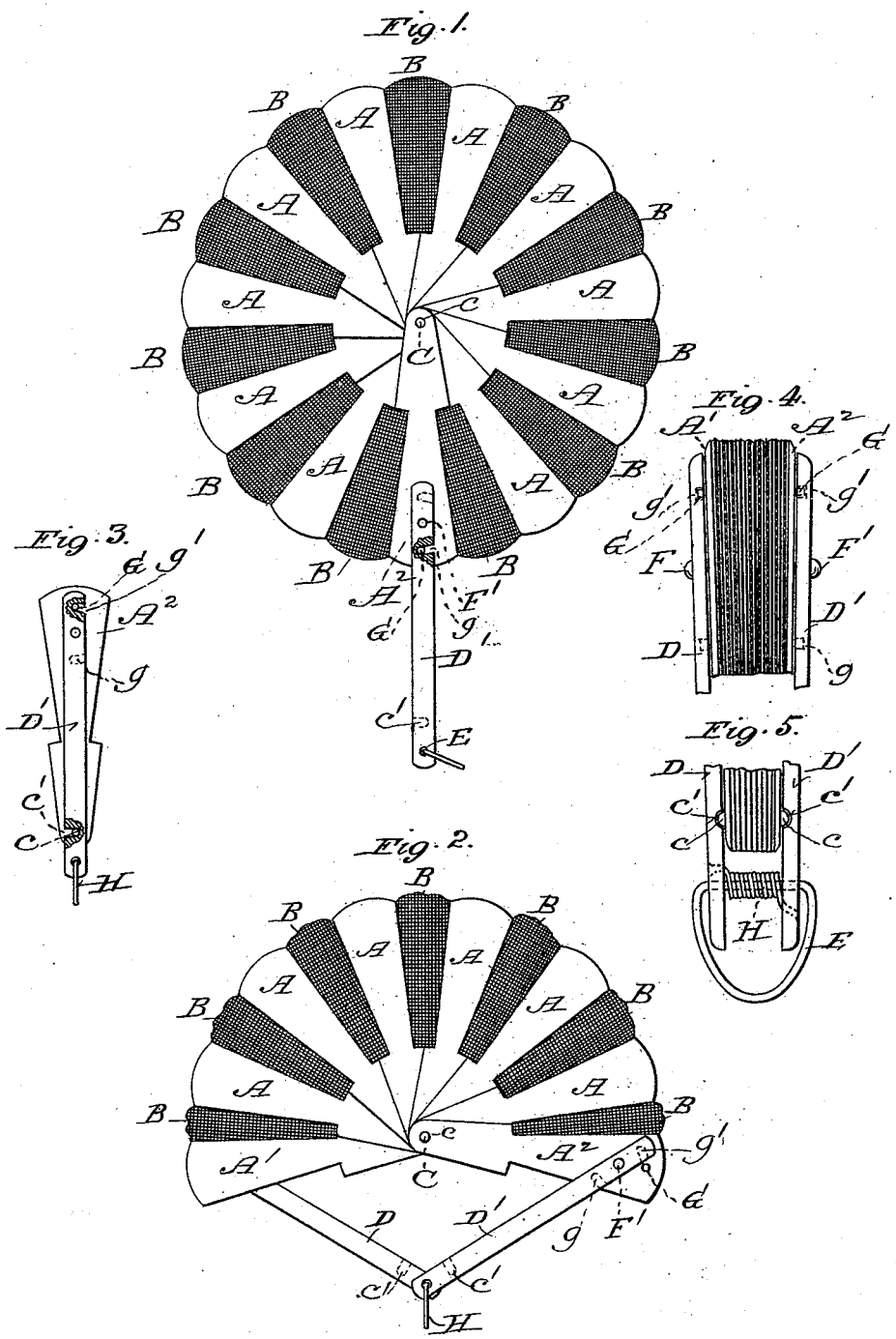

UNITED STATES PATENT OFFICE.

ALPHONSE T. CWERDINSKI, OF ST. LOUIS, MISSOURI.

FAN.

SPECIFICATION forming part of Letters Patent No. 523,762, dated July 31, 1894.

Application filed July 3, 1893. Serial No. 479,518. (Model.)

*To all whom it may concern:*

Be it known that I, ALPHONSE T. CWERDINSKI, of St. Louis, Missouri, have made a new and useful Improvement in Fans, of which the following is a full, clear, and exact description.

The improvement relates to that class of fans that are held in the hand and have leaves which are pivoted together to be unfolded, and when unfolded to form, in combination, a circular or substantially circular fan having a handle by which the fan can be operated, and the improvement consists, substantially as is hereinafter set forth and claimed, aided by the annexed drawings, making part of this specification, in which—

Figure 1 is a view of the improved fan opened as in use; Fig. 2 a view of the fan partly folded; Fig. 3 a view of the fan folded; and Figs. 4 and 5 views, upon an enlarged scale, of the fan folded; the views are elevations at right angles to that of Fig. 3, and show respectively the outer portion and the inner portion of the fan.

The same letters of reference denote the same parts.

A A A represent the main leaves of the fan, and B B represent the flexible or foldable webs which serve to connect the leaves at the outer part thereof. The leaves A A are pivoted to each other at their inner end by means of a suitable pivot C, all in the customary manner saving as modified or supplemented by the improvement under consideration.

D D', represent the bars which constitute the handle of the fan. They are pivoted together at the inner end thereof by means of a suitable pivot E, and at the opposite or outer end they are pivoted to the leaves A, and respectively to the outermost or end leaves A' A² of the series of leaves, and at or toward the outer end of the leaves, and, respectively by means of the pivots F F'. The handle-bars, by this means, need not be, and in practice preferably are but slightly longer than the length of the leaves A, the handle-bars when the fan is closed, projecting just far enough beyond the inner end of the leaves to provide for pivoting the handle bars together.

The operation of the fan is illustrated in Figs. 1, 2, and 3. When the fan is folded the leaves are closed upon themselves in the ordinary manner, but the handle bars in the place of being substantially extensions of the end leaves of the fan, and rigidly connected therewith, are capable of being turned upon the end-leaves at the points at which they are respectively pivoted thereto, and closed and folded thereupon, substantially as shown in Fig. 3. And in unfolding the fan the leaves are not only opened upon their pivot but the handle bars are also turned upon their pivots, and also upon each other, bringing the various parts of the fan first into the position shown in Fig. 2 and then into the open position shown in Fig. 1, in which the handle bars are made to project from the leaves sufficiently to form a handle.

An additional feature of the fan is the spring H which is connected with the handle bars at the inner end thereof in such a manner as to incline the handle bars to remain in line with each other when the fan is folded or unfolded. That is, whether the fan is folded as in Fig. 3, or unfolded as in Fig. 1, the spring is constructed and adjusted to incline the handle bars to remain opposite each other, and when the fan is partly unfolded as in Fig. 2 to incline the handle-bars to come into the same plane or opposite each other.

Another feature is the stop G upon each of the end leaves. When the fan is opened these stops encounter a shoulder of some kind upon the handle-bars and the further movement in that direction of the leaves and handle bars is prevented. In practice I prefer to have the stop enter a groove, $g$, in the handle-bar and to have the inner end of said groove to form the shoulder in question. More for the sake of covering the stop G, when the fan is closed, the handle-bar is provided with another groove $g'$ into which the stop passes when the fan is closed. The inner end of said last named groove may also act as a stop in keeping the leaves and handle-bars relatively in position when the fan is closed. The pivot C is extended substantially as shown at $c$, $c$, to form stops which, by coming against shoulders upon the handle-bars when the fan is closed, serve to prevent the leaves and handle-bars from being turned too far upon each other. And in carrying out this last mentioned feature I prefer to groove the handle bars at $c'$, $c'$, respectively and have the extensions $c$, $c$, encounter the inner ends of the grooves which form the described shoulders. The pivot E, at the inner end of the handle-parts is preferably in the form of the ring shown.

I desire not to be limited to the special means shown, that is the foldable web, for connecting the leaves, as other means for that purpose may be employed.

I claim—

1. The combination in a fan of the leaves and the handle bars, said leaves being pivoted together at the inner end thereof and united as described, and said handle bars being respectively pivoted to the end-leaves at or toward the outer end thereof, and at the other end being jointed together, substantially as described.

2. The combination of the leaves, and the handle bars, said leaves being pivoted together at the inner end thereof and at the outer part thereof being united as described, said handle bars at the inner end thereof being pivoted together, and at the outer end thereof being pivoted to the end-leaves at or toward the outer end thereof, and said end leaves having stops to engage with said handle bars when the fan is folded and unfolded, substantially as described.

3. The combination of the leaves, the handle-bars, and spring, said leaves being pivoted together at the inner end thereof, and united as described, said handle-bars being respectively pivoted to the end leaves at or toward the outer end thereof, and at the other end being jointed together, said spring being attached to said handle-bars, and said end-leaves having stops to engage with said handle bars when the fan is folded and unfolded, substantially as described.

Witness my hand this 15th day of June, 1893.

ALPHONSE T. CWERDINSKI.

Witnesses:
C. D. MOODY,
EDWARD A. FURRELL.